(No Model.)

C. W. PHELPS.
WHIFFLETREE HOOK.

No. 532,181. Patented Jan. 8, 1895.

WITNESSES,
J. Lamberger Jr.
E. N. Hunt

INVENTOR,
Charles W. Phelps.
By John E. Miles.
ATTORNEY.

THE NORRIS PETERS CO., PHOTO-LITHO., WASHINGTON, D. C.

UNITED STATES PATENT OFFICE.

CHARLES W. PHELPS, OF RACINE, WISCONSIN.

WHIFFLETREE-HOOK.

SPECIFICATION forming part of Letters Patent No. 532,181, dated January 8, 1895.

Application filed May 31, 1894. Serial No. 513,034. (No model.)

*To all whom it may concern:*

Be it known that I, CHARLES W. PHELPS, a citizen of the United States, residing at Racine, county of Racine, State of Wisconsin, have invented a certain new and useful Improvement in Whiffletree-Hooks; and I declare the following to be a full, clear, and exact description of the invention, such as will enable others skilled in the art to which it pertains to make and use the same, reference being had to the accompanying drawings, which form a part of this specification.

My invention relates to new and useful improvements in whiffletree-hooks, and consists in the matters hereinafter described and pointed out in the appended claims.

Figure 1:
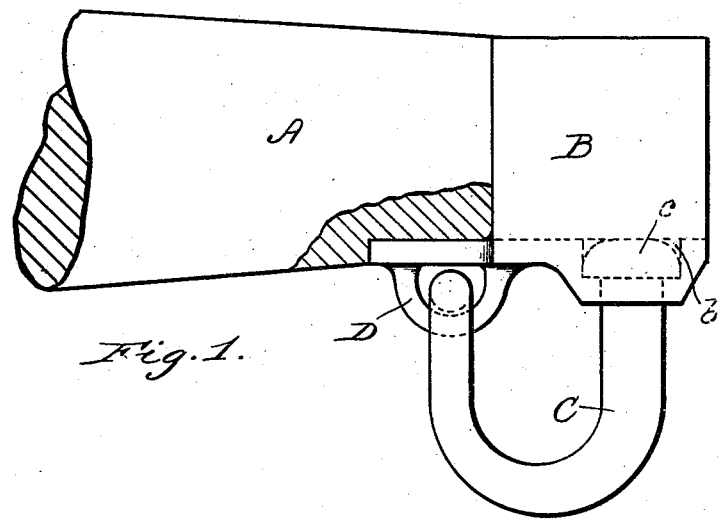
Figure 2:
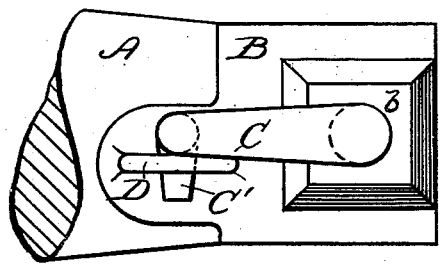
Figure 3:
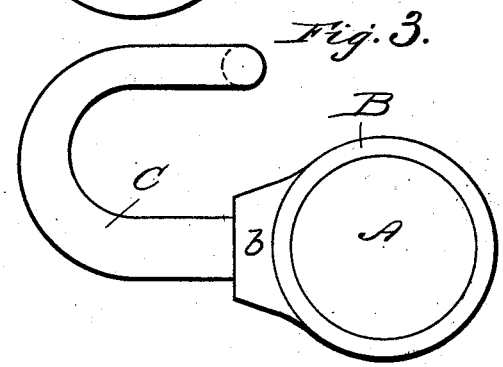
Figure 4:
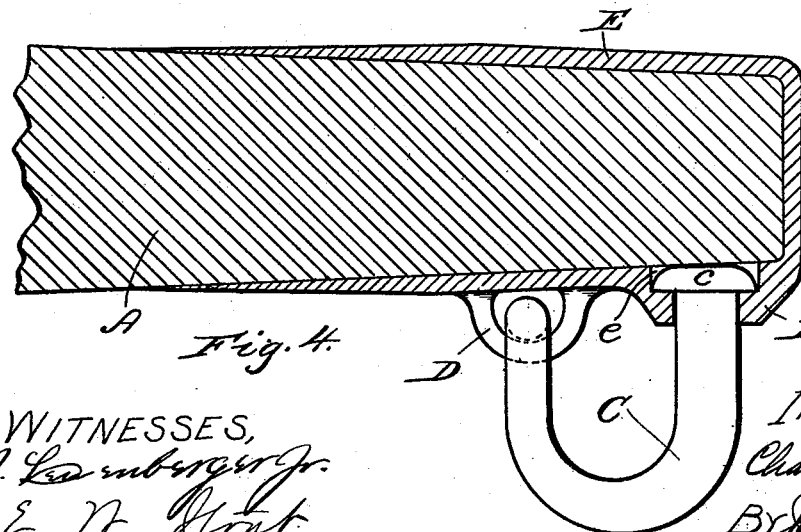

In the accompanying drawings illustrating my invention, Figure 1 is a plan view of one form of my improved device. Fig. 2 is a front elevation of the same. Fig. 3 is an end view of the whiffletree showing the hook in its raised position. Fig. 4 is a horizontal sectional view illustrating a somewhat different form of my device.

Referring by letter to said drawings, A designates the whiffletree which may be of any desired construction.

In the particular form of device illustrated in Figs. 1, 2 and 3, the whiffletree A is provided at its end with a ferrule B, to which the hook C is secured by means of a swivel joint. This joint is formed in substantially the manner shown in the drawings, in which a head $c$ is shown as provided upon the shank of the hook C, and adapted for revoluble engagement within a socket $b$ formed in an enlargement upon one side of the ferrule B. This construction enables the hook C to be rotated upon the horizontal axis formed by the shank of the hook adjacent to the head so as to bring the hook to the position illustrated in Figs. 1 and 2, or into the position shown in Fig. 3. The free end of the hook C is provided with a downwardly bent finger C' adapted for engagement with an apertured ear or loop D so as to be supported in a horizontal position in the manner indicated in the drawings.

The apertured ear may be formed integrally with the ferrule in the manner shown in the drawings, or may consist of a suitable staple or loop secured to the whiffletree, in any desired manner.

When the hook C is in the position indicated in Figs. 1 and 2 of the drawings, a trace or chain which may be engaged with said hook will be securely retained in its engagement therewith in an obvious manner, the weight of the trace or chain and the hook serving to hold the free end of the hook in engagement with the apertured ear or loop D.

When it is desired to remove the trace or chain from engagement with the hook, the hook may be rotated into the position indicated in Fig. 3 so as to enable said trace or chain to be slipped off over the free end of the hook.

Instead of providing the ferrule indicated in Figs. 1 to 3 inclusive, I may, if desired, engage the hook with the whiffletree through the medium of a strap E passed around the end of the whiffletree and provided with an enlargement E', in which is formed a socket $e$ for the reception of the head $c$, upon the shank of the hook, and the loop D being formed integrally with the strap E.

By my improved construction, I am enabled to provide a very satisfactory form of whiffletree-hook adapted to be securely held in operative position when in use, by the weight of the hook itself and the part of the harness engaged therewith, and my device therefore is not liable to be accidentally displaced when in use. A further advantage gained by my improvement is that the trace or chain may be readily removed from the hook under any circumstances, whereas in the use of ordinary forms of hooks it sometimes becomes necessary in case of accident to cut the trace in order to liberate the horse.

Having thus described my invention, what I claim as new, and desire to obtain by Letters Patent of the United States, is—

1. The combination with a whiffletree of a metallic fitting secured to the end thereof, and provided with a socket arranged to come upon the forward side of the whiffletree, a hook provided with a shank terminating in a head adapted for revoluble engagement with said socket, and a suitable stop arranged in the path of the free end of the hook, and adapted for engagement therewith when said hook is in a horizontal position, substantially as described.

2. The combination with a whiffletree of a metallic fitting secured to the end thereof and provided with a socket arranged to come upon the forward side of the whiffletree, a hook provided with a shank terminating in a head and adapted for revoluble engagement within said socket, and an apertured ear or loop arranged in the path of the free end of the hook and adapted for engagement therewith when the hook is in a horizontal position, substantially as described.

3. The combination with a whiffletree of a metallic fitting secured to the end thereof, and provided with a socket arranged to come upon the forward side of the whiffletree, a hook provided with a shank terminating in a head and adapted for revoluble engagement within said socket, an apertured ear or loop upon the forward side of the whiffletree and an angular finger or point upon said free end of the hook adapted for engagement with said ear or loop, when the hook is in a horizontal position, substantially as described.

4. The combination with a whiffletree of a metallic fitting secured to the end thereof, and provided with a socket arranged to come upon the forward side of the whiffletree, a hook provided with a shank terminating in a head adapted for revoluble engagement within said socket, an apertured ear or loop upon the forward side of the whiffletree, and a finger or point upon the free end of the hook arranged substantially vertical with respect to the plane of said hook, and adapted for engagement with said ear or loop when the hook is in a horizontal position, substantially as described.

In testimony whereof I sign this specification in the presence of two witnesses.

CHARLES W. PHELPS.

Witnesses:
F. B. WASHBURN, Jr.,
J. F. BICKEL.